Patented Dec. 1, 1936

2,062,411

UNITED STATES PATENT OFFICE 2,062,411

DEPILATORY

Henrietta A. Fischer, Pittsburgh, Pa.

No Drawing. Application March 9, 1934,
Serial No. 714,889

1 Claim. (Cl. 167—89)

My invention relates to depilatories of the type commonly classified with cosmetics, and more particularly to those of a plastic or waxy nature.

One object of my invention is to provide a depilatory composition which will be more effective in removing superfluous hair from the body than various types of depilatories heretofore employed.

Another object of my invention is to provide a depilatory of the type referred to which can be softened and applied to the body at temperatures not greatly in excess of normal body temperatures, with consequent avoidance of burning or blistering of the skin, as the result of excessive heat, and without danger of infection.

The composition includes the following ingredients:—

| | |
|---|---|
| Rosin | 5 lbs. |
| Beeswax | 1 lb. 4 oz. |
| Synthetic amber | 15½ grains | to which may be aded

| | |
|---|---|
| Oil-soluble red dye | ¼ gr. |

The synthetic amber referred to is composed of musk ambrette and labdanum resin which can be suitably mixed together in substantially equal quantities, at a temperature of approximately 85° centigrade. Musk ambrette is chemically designated as di-nitro-butyl-cresol-methyl-ether, while the labdanum resin is obtained from several species of Cistus. This product, used with a low-melting wax, promotes adhesion of the composition when applied to the body, while increasing the plasticity of the rosin and wax. There is also a softening and soothing effect on the skin, and stimulation of circulation at the areas being treated.

In preparing the mixture, the wax is heated to a temperature preferably between 145° F. and 150° F. A double boiler is convenient for this purpose. When the wax has become melted, the rosin is added in the form of small pieces, a few at a time, while maintaining the melting temperature of the wax.

After the rosin has become melted and mixed with the wax, the synthetic amber is added while stirring the mixture. The stirring is continued until the amber is thoroughly incorporated, and the mixture has become aerated.

The oil soluble red dye is employed primarily for the purpose of giving a flesh-like color to the mixture, and the beeswax employed is preferably white, so that the mixture will be more pleasing to the eye.

Upon completion of the mixing operation, the composition is poured into molds and permitted to harden, and to be wrapped and sold. The composition will ordinarily be molded into the form of sticks of various diameters, depending upon the areas of the body which are to be treated. For example, a stick of about ³⁄₁₆" in diameter is suitable for removing hair from the eyebrows; ⅝" sticks are convenient for use on the upper lip, face and chin, while still larger sticks may be provided for melting down and applying with a wooden spatula on large areas of the body when giving full leg or full arm treatment. The composition can, of course, be molded into the form of cakes.

The larger sticks and the cakes can be softened or melted in a double boiler, preliminary to application of the mixture to the skin. The use of the synthetic amber permits of softening the smaller sticks simply by holding them in hot water, preferably at about 200° F. The ends of the sticks when thus softened can be shaken clear of the water and applied to the eye-brows or other areas to effect a deposit of the softened mixture.

The use of the synthetic amber and the aeration of the mixture enables it to be softened at a temperature of 115° F. to 125° F. Within this temperature range the mixture can be applied to the skin with very satisfactory results, and with no danger of burning. The synthetic amber also causes the mixture to adhere more firmly to the hair and to remain plastic much longer.

After the application of the mixture to the body, in a plastic condition, it is permitted to remain in place for from 3 to 15 minutes, depending upon atmospheric conditions and the quantity of compound used. Thereupon it can be lifted away and will bring with it the hair which has been imbedded thereby.

I claim as my invention:—

A depilatory comprising:

| | |
|---|---|
| Rosin | 5 lbs. |
| Beeswax | 1¼ lbs. |
| Synthetic amber | 15½ grains | the snythetic amber being composed of musk ambrette and labdanum resin, in approximately equal quantities.

HENRIETTA A. FISCHER.